Aug. 25, 1964 E. D. JORDAN 3,146,349
DETECTING HIDDEN EXPLOSIVES USING NEUTRON BEAMS
Filed Dec. 1, 1961 4 Sheets-Sheet 1

INVENTOR.
EDWARD D. JORDAN
BY
*Roland A. Goodman*
ATTORNEY

INVENTOR.
EDWARD D. JORDAN
BY
ATTORNEY

Aug. 25, 1964   E. D. JORDAN   3,146,349
DETECTING HIDDEN EXPLOSIVES USING NEUTRON BEAMS
Filed Dec. 1, 1961   4 Sheets-Sheet 3

INVENTOR.
EDWARD D. JORDAN
BY
ATTORNEY

Aug. 25, 1964  E. D. JORDAN  3,146,349
DETECTING HIDDEN EXPLOSIVES USING NEUTRON BEAMS
Filed Dec. 1, 1961  4 Sheets-Sheet 4

INVENTOR.
EDWARD D. JORDAN
BY
ATTORNEY

United States Patent Office 3,146,349
Patented Aug. 25, 1964

3,146,349
DETECTING HIDDEN EXPLOSIVES USING NEUTRON BEAMS
Edward D. Jordan, Kensington, Md., assignor to the United States of America as represented by the United States Atomic Energy Commission
Filed Dec. 1, 1961, Ser. No. 157,051
14 Claims. (Cl. 250—71.5)

This invention relates to improved apparatus and methods of detection. More particularly, the invention relates to detection by the use of neutron absorbing material.

While the methods and apparatus of this invention have application to the detection of crime, disease, point of origin of a material and many other applications, one particular application of the invention is the detection of explosives in luggage prior to its being loaded onto an airplane.

Sabotage and the threat of sabotage of commercial passenger aircraft by detonation of explosives in passenger luggage has become a problem of major concern to the United States Government, to the airline industry, and to the public. The vulnerability of modern aircraft to destruction by this means has received wide public notice in recent years following several successful attempts which have resulted in heavy loss of life and property. It is probable that this type of sabotage will continue to be attempted from time-to-time in the future. It is also probable that each major airline loss in the foreseeable future, from whatever cause, will raise at least initial speculation in the world press concerning sabotage by explosives in luggage. Such notice can only serve to excite those few persons who are inclined to make such attempts while decreasing the confidence of the public in the ability of the airlines and of the Government to protect them from such dangers. Times of national emergency, such as war or the threat of war, will increase the passenger mission of the nation's airlines and will also probably increase the number of persons who would attempt sabotage.

Many schemes have been proposed for the prevention of such attempts at sabotage, few of which appear, upon first analysis, to be immediately feasible. Such schemes are generally based upon some method for the surveillance of passenger luggage before loading aboard the aircraft without requiring any but suspicious pieces to be opened for inspection. It is hoped, in each scheme, that the method would result in little delay to innocent luggage but would have good efficiency for selecting suspicious pieces with few false alarms. All such schemes appear to involve not only a technical problem, but also problems with economic, operational, psychological and legal aspects.

The explosive detection problem is complicated by the fact that explosives may be carried aboard aircraft either in suitcases, or similar containers, "carry-on" items such as briefcases, travel bags and large pocketbooks, or concealed on the passenger's body. It would be desirable to develop a detectional device which could be used not only on various baggage but on passengers as well.

EXPLOSIVE DETECTION BY NUCLEAR TECHNIQUES

As noted above, various schemes have been proposed for the rapid detection of explosive materials in luggage. These different approaches to the problem can be divided into two main categories, viz, non-nuclear and nuclear tchniques. Among the non-nuclear approaches are the use of possible devices utilizing vibrations, sound waves, radio waves and X-rays. These proposed non-nuclear techniques are described and evaluated in some detail by the Stanford Research Institute report on commercial aircraft destruction by explosives entitled "Feasibility Study of Protecting Aircraft Against Flight Bombing," August 1960.

Possible nuclear approaches to the problem of explosive detection may further be characterized into approaches which utilize additive materials and those which do not utilize additives. The invention provides several methods of explosive detection. One such method not utilizing additives are nitrogen detection devices which detect either gamma radiation from nitrogen after exposure to a thermal neutron flux or the back-scattering by nitrogen of fast neutrons. Method utilizing additives include the use of the (n, a) reaction in boron, thermal neutron flux depression (n, γ) reactions in high cross section materials, neutron activation analysis and the Mössbauer effect. Each of these approaches to problem will be discussed briefly.

It is an object of this invention to provide convenient apparatus and a method for detection purposes.

It is another object to provide novel methods and apparatus for detecting explosives in luggage and particularly having a good signal to background ratio.

A further object is to provide methods and apparatus for detection with a neutron source in which the object detected has been seeded with a high cross section neutron absorber.

These, and further objects are accomplished by several methods. One method includes irradiating a suspected container with neutrons so that the nitrogen present in any explosive will emit a gamma ray which is detected. Another method is the addition of a high cross section neutron absorber such as boron to the explosive powder when manufactured whereby the irradiation with a neutron source would emit a gamma ray.

Detection apparatus may then be arranged to monitor either the emitted gamma rays or the depression in the neutron field caused by the presence of an explosive.

One of the problems which is encountered in any such systems is that their accuracy is impaired by any stray radiation from the neutron source. Accordingly, the results of this invention show the variations in the signal to background signal ratio so that the apparatus may be arranged to detect the explosive under conditions having a large signal to background ratio.

The above mentioned and other objects will be apparent to those skilled in the art upon reading the following detailed disclosure of which:

Figure 1:
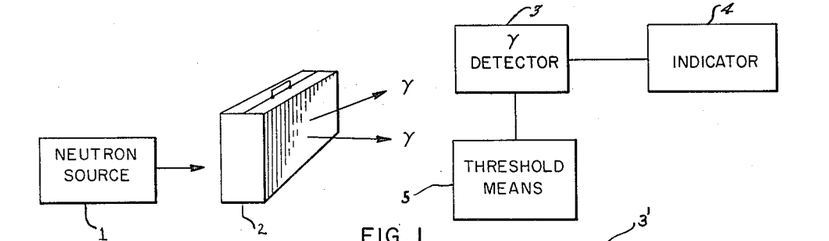
FIGURE 1 is a block diagram of a neutron source, suitcase and gamma detector circuit.

FIGURE 1 illustrates a method for detecting explosives in a suitcase without the addition of additive materials to the explosive. Since most explosives such as nitroglycerin or ammonium nitrate have a percentage of nitrogen, it has been found that when a source of neutrons 1 directs a beam of neutrons at a suitcase 2 containing an explosive, 10.8 mev. gamma rays are emitted from the nitrogen nucleus which can be detected by a conventional gamma ray detector 3.

Since a large amount of luggage would usually be examined by such apparatus during any one day of which only a few bombs will be present, any person who is required to continually watch the detector will soon lose interest in the job. Accordingly, a bell or light type indicator 4 is connected to operate when an explosive is detected.

However, it has been found that the suitcases themselves, as well as the materials within them, contain a certain amount of nitrogen. Therefore, a threshold means 5 is connected to the detector 3 so that the indicator is not operated for a certain minimum gamma ray count. For all values above this count, the alarm indicator is operated and the baggage is inspected.

Figure 2:
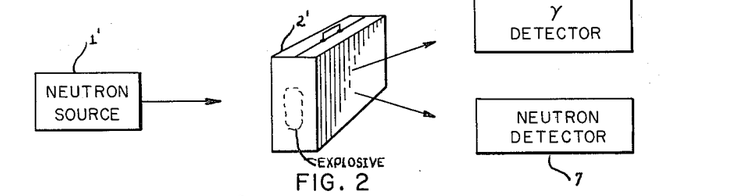
FIGURE 2 is a modification of FIGURE 1.

FIGURE 2 illustrates another method of detecting explosives by the addition of non-radioactive materials to the explosive.

NON-RADIOACTIVE MATERIAL ADDITIVES

The Interstate Commerce Commission regulates the manufacture, transportation, and storage of explosives and makes it unlawful to ship and store explosives without a permit. If this Commission requires, by law, the addition of a non-radioactive material to explosives, then every cartridge of explosive which would come into the possession of an aircraft saboteur would have a small percentage of a particular inert detectable material added to its composition. By replacing the depleted stocks of explosives with seeded explosives, commercial explosives would soon contain primarily "detectable explosives."

Thus, FIGURE 2 illustrates a detection method if a small amount of non-radioactive material is added to commercial explosive which is within the suitcase. The potential explosive container (luggage) is exposed to a low level thermal neutron flux field from source $2^1$. The additive material in the explosive preferentially absorbs neutrons which result in both the instantaneous liberation of gamma radiation and the depression of the thermal neutron flux field due to neutron captures in the additive material. By scanning the suspected luggage with a gamma or neutron detector, the hidden explosive may be detected. This technique of FIGURE 2 requires the use of a high neutron cross section additive material since there appears to be no element which is a common constituent of explosives which preferentially absorbs neutrons. Preferably, only natural elements and not isotopes should be considered as the additive material because additional economic costs incurred in isotopic separation schemes appear prohibitive.

One version of this approach in FIGURE 2 incorporates boron into some component of the explosive device. This material has a high cross section for thermal neutron capture and is relatively low in cost. Boron upon capturing thermal neutrons emits a gamma ray of 0.477 mev. which can be readily detected. Because of the low neutron flux level the irradiated luggage is free of radioactive contamination at all times.

Another version of this scheme would monitor the thermal neutron flux passing through the luggage material by the use of neutron detector 7. Capture of neutrons by the high cross section additive material depresses the thermal neutron flux which is indicative of the presence of explosives. Of course, various indicators and counters may be connected to the detectors $3^1$ and 7.

Alternately, any other high thermal neutron cross section material may be added to the explosive device. Either the gamma radiation or thermal neutron flux depression may be monitored.

Methods which can detect the smallest quantity of explosives in the shortest time appear to require the addition of additive materials to the explosive device. The use of additives would require the cooperation of explosive manufacturers as well as government regulatory agencies.

While a system such as shown in FIGURE 2 by block diagram is the central idea of this invention, it is obvious that there are many problems involved in making such apparatus an efficient detector of explosives. In particular, many of the neutrons may by-pass the luggage and/or explosives and yet hit the detector so that even in the absence of an explosive there is a large amount of detected background radiation. Thus when an explosive is introduced, the signal detected will increase if the gamma rays are being detected or decrease if the neutron depression is being detected. Also, for luggage of different sizes or of different contents the background signal level will vary and accordingly two suitcases of different size or different contents will provide a different signal even though they have the same explosive content. Therefore, it is highly desirable that the signal detected should accurately indicate the presence of an explosive, as for example, by requiring that the signal to noise or background for such detection apparatus should be large. Therefore, it is an important aspect of this invention to provide apparatus and a method for providing such high signal to background ratio.

THEORY AND DESIRABILITY OF THE NEUTRON-BORON ACTION

Boron Additive Utilizing Thermal Neutron Capture Reaction

The use of neutron radiation has been considered in the explosive detection devices of this invention because of its high penetrating power. Since this radiation is penetrating, it can pass through most materials of various thicknesses without severe attenuation. Attenuation can be caused by certain elements that strongly absorb neutrons. These elements, however, are not usually consdiered to be common elements. Therefore, most ordinary luggage materials would be expected to have a small reaction rate when exposed to a thermal neutron flux. By adding a material which has a high cross section, such as boron, to some component of the explosive device, explosives may be detected by monitoring for the resultant radiation accompanying neutron capture by this material.

The probability for thermal neutron capture by elemental boron with the direct liberation of a gamma ray is small. This reaction referred to as the (n, γ) reaction is only approximately 0.5 barn. However, the probability for thermal neutron capture with the liberation of an alpha particle, or the (n, a) reaction, is quite large.

Recent measurements indicate that the (n, a) process has a thermal neutron cross section of 795 barns for elemental boron, which is due to the approximate 19.8% of the isotope boron-10 in elemental boron. Thermal neutron capture by boron-10 which has a cross section of 4017 barns (5) can be represented by the following nuclei balance equations:

The indicated branching ratio which leads either to the excited state ($Li^7$) or ground state of lithium-7 varies with the incident neutron energy as seen in Table I.

TABLE I.—NEUTRON INDUCED $Li^7$ BRANCHING RATIO

| Neutron energy (mev.): | Branching ratio, $Li^7/(Li^7)^*$ |
|---|---|
| Thermal | 0.086 |
| 0.35 | 0.20 |
| 1.90 | $^1$ 2.3 |
| 2.60 | 0.80 |

$^1$ Max. value.

Hence for thermal neutron capture there is an effective cross section of 732 barns for the production of the excited state of lithium-7 and, therefore, the 0.477 mev. gamma ray. Because the excited state of lithium-7 decays to the ground state within $10^{-14}$ sec. after neutron capture, the production of gamma radiation is instantaneous. Because of boron's high cross section, low atomic number, and the indirect production of a single gamma ray upon neutron capture, it can be used as a method of detecting directly the presence of boron or the location of boron in a particular sample of explosive material.

*The Apparatus*

Figure 3:
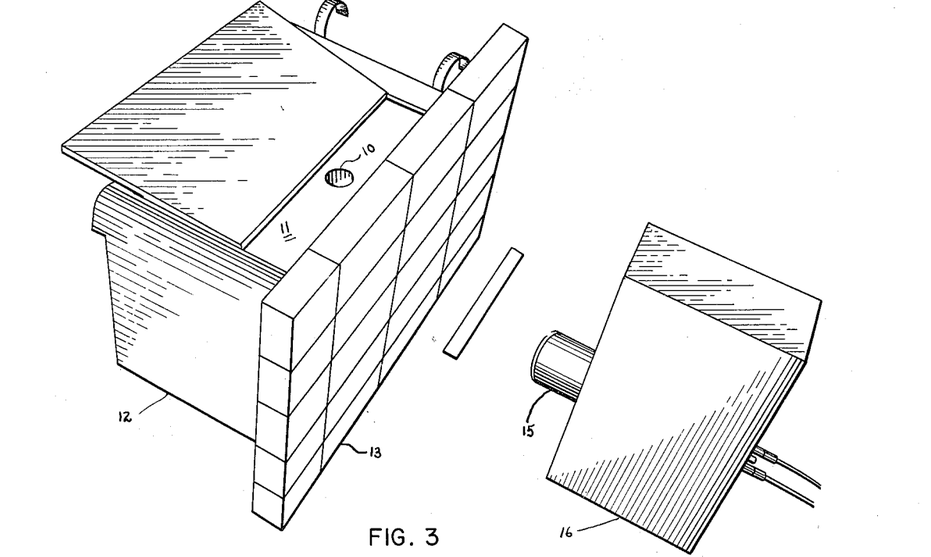
FIGURE 3 is pictorial view of the apparatus of this invention.

FIGURE 3 presents a view of the experimental detection device as set up for a test channel width of 25 cm.

PLUTONIUM-BERYLLIUM NEUTRON SOURCES

The neutron sources used in these measurements were plutonium-beryllium sources. The long halflife of plutonium-239 (24,600 years) makes possible the fabrication of neutron sources of essentially a constant neutron emission rate. Fast neutrons are produced by the following reactions:

$$_{94}Pu^{239} \rightarrow {}_{92}U^{235} + a$$
$$a + {}_4Be^9 \rightarrow ({}_6C^{12})^* + n$$
$$({}_6C^{12})^* \rightarrow {}_6C^{12} + \gamma(4.43 \text{ mev.})$$

The neutron spectra resulting from the interaction of the alpha particles and beryllium is in the mev. region and is complex with the average fast neutron energy between 3 and 5 mev. The maximum neutron energy is 10.6 mev. As seen from the above nuclei balance equations, gamma radiation is produced along with fast neutrons from the de-excitation of the first excited state of carbon-12.

The neutron source is inserted into the 2 inch diameter hole 10 in the top of the paraffin ($C_{30}H_{62}$) block 11. The hydrogeneous paraffin acts as a neutron moderator to slow down or thermalize the fast neutrons emitted by the source which have an average energy of 3 to 5 mev. The box 12 containing the paraffin is constructed of one-half inch thick plywood with overall dimensions of 40.9 cm. in height, 51.1 cm. in width along the test channel and 34.1 cm. in depth away from the test channel. The dimensions of the paraffin within the box are approximately 36.8 by 47.3 by 30.4 cm. Imbedded within the block of paraffin in the center of the front face between the neutron source and the lead wall is a 5.08 cm. thick layer of lead of 10.2 cm. cross section. The lead wall 13, in front of the paraffin box is 5.08 cm. thick, 71.4 cm. wide and 50.8 cm. high. The purpose of the lead shielding is to prevent gamma radiation from the neutron source as well as backscattered gamma radiation from reaching the scintillation crystal 15. The lead allows the thermalized neutrons .025 ev. to diffuse through it into the test channel without severe attenuation because of its low thermal neutron capture cross section.

The test channel in which suspected explosive containers are irradiated is the space between the lead wall and the face of the cylindrical scintillation crystal 15. The width of the test channel may be varied; a 25 cm. test channel is shown in FIGURE 3. The scintillation crystal which primarily detects gamma radiation can be positioned in one of four possible locations in the detector mounting device 16. This mounting device consists of a thin walled (7/16 in.) plywood frame, 50.3 cm. high, 12.2 cm. wide and 25.4 cm. deep, with various detector elevation positions with respect to the base of the test channel. The lower base of the scintillation crystal can be located at various positions above the test channel base.

Figure 4:
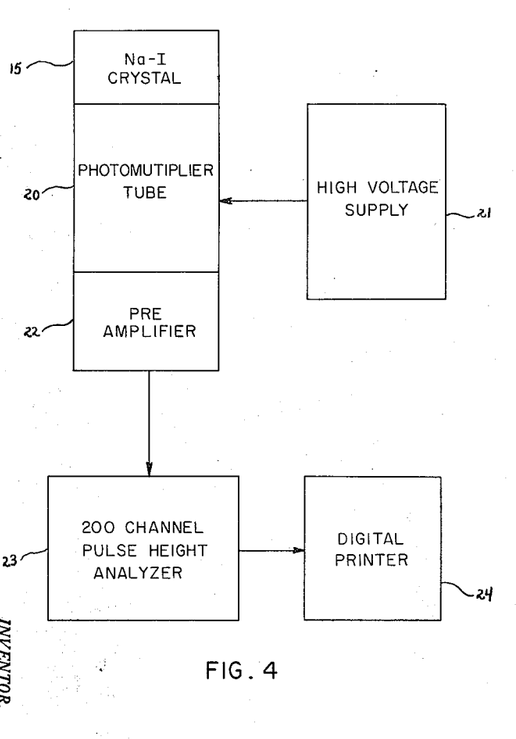
FIGURE 4 is a block diagram of the electrical circuit associated with a gamma ray detector.

FIGURE 4 presents a block diagram of the electronic and detectional equipment used in the experimental detection system. The standard scintillation crystal is of the sodium iodide (thallium activated) type, 3 inch in diameter and 3 inch long with 10.6% resolution as calibrated with cesium-137. Radiation striking the crystal produces light pulses which can be detected by the photomultiplier tube 20. A high voltage power supply 21 (RIDL Model No. 40-2) drives the photomultiplier tube which feeds its output pulse into a transistorized preamplifier 22 (RIDL Model No. 10-3) to drive the pulse through a length of cable into a two hundred channel pulse height analyzer 23 (RIDL Model No. 34-8). The output of the analyzer is fed to a digital computer 24 (CMC Model No. 400 CT) which tabulates a 200 column listing of count rate for each channel or energy level. It should be noted that this equipment consists of "research type" units which contain a maximum degree of flexibility. A tentative commercial product could be scaled down drastically into a single item of equipment utilizing a single two channel pulse height analyzer with incorporated power supply, ratemeter and alarm system.

Explosive test cartridges consisting of ammonium nitrate and boric acid were used for all explosive simulation measurements and were placed at various points between the neutron source and detector. The test cartridges consisted of a nominal one-half-pound dynamite shell loaded with cylindrical pellets. These pellets were compressed homogeneous mixtures of ammonium nitrate and boric acid powder. Eight of these pellets, each with dimensions 1.175 inches in diameter and 1.00 inch in length, standing on end, were inserted into standard cartridge shells. This resulted in a standard eight inch commercial explosive cartridge. Seven different boron concentrations were used varying from 3.5% to zero, where 3.5% equalled 8.3 grams. The cartridge shell encasing the pellets were standard dynamite shells of wax sprayed paper. The finished fabricated cartridge was 1.25 inch in diameter and approximately 8.0 inch in height. The weight of the test cartridges is comparable to that of commercial dynamite cartridges.

PRELIMINARY OPTIMIZATION OF SIGNAL TO BACKGROUND RATIO

The term signal to background ratio as used in this invention is derived from the following considerations. Background includes radiation detected by the crystal from all sources excluding the gamma radiation produced by boron upon neutron capture. Therefore, the background count rate included activation of the crystal by fast and slow neutrons striking the crystal as well as gamma radiation originating from the neutron source, ordinary background (cosmic radiation and ground radioactivity) and radiation from external radioactive sources such as luminous watch faces. The signal is defined as the sum of all the background radiation plus the gamma radiation reaching the crystal detector from decay of the excited state of lithium-7 upon thermal neutron capture by boron. The ratio of signal to background is an indication of the efficiency of boron detection. It is important to note a distinction between the term "background" as used here and term "noise" as sometimes used in these types of measurements. Noise usually indicates a low statistical fluctuation beyond the control of the experimenter. The background in these measurements is a high statistical fluctuation somewhat controlled by the experimenter because of the large effect of background gamma radiation and crystal activation due to the presence of the neutron source.

In these optimization measurements a 25 cm. test channel width was used. Signal to background ratios were obtained by taking measurements with cartridge "A" (3.5 percent boron) for the signal count rate and cartridge "G" (no boron) for the background count rate.

One of the first considerations in the selection of the experimental geometry is the amount and configuration of the moderator surrounding the neutron source. Two factors determine the size of the paraffin block, value of the signal to background ratio and a reasonably small and low weight container which would be portable for the purpose of technical demonstrations. Measurements indicated that the greater the amount of paraffin surrounding the source the greater the signal to background ratio. The final selection of the moderator dimensions was determined primarily by the portability requirement which resulted in a reasonably high signal to background ratio. A permanent installation could entail a larger amount of moderating material surrounding the source with a subsequent increase in the signal to background ratio.

Various shielding materials were considered to determine their relative effectiveness upon the signal to background ratio. Among the materials tested were lead, bismuth and steel. After many tests in which materials, geometry and neutron source position within the moderator were varied, it appears that the best combination requires the use of lead. The lead brick 13 within the moderator assembly was placed along the surface of the paraffin block facing the test channel with provision for placing the various neutron sources directly behind it.

PLUTONIUM-BERYLLIUM NEUTRON SOURCE MEASUREMENTS

The experimental detection device described above was activated with constant emission rate plutonium-beryllium neutron sources to determine signal to background ratios for various explosive test cartridges. The calibration of the three inch scintillation crystal (performed with cesium-137 and cobalt-60) was approximately 0.016 mev. per channel. The experimental procedure consisted of taking a measurement with the non-borated explosive test cartridge (cartridge "G") to produce a background reading and then replacing the non-borated cartridge with a borated cartridge to produce a signal count rate. The peak channel count rate (about the energy region 0.477 mev.) was determined for each measurement in the test channel. Five individual measurements were taken for each signal to background ratio. An average was taken of the five ratios as an indication of the signal to background ratio under a specified set of conditions. The calculated error indicated for the average signal to background ratio is the standard deviation of the average value. For a single measurement the standard deviation would be greater than the indicated deviation by a factor of the square root of five.

SIGNAL TO BACKGROUND EXPERIMENTAL RESULTS

Various experiments were conducted to determine the best operating conditions and particularly the best signal to background ratio. In these experiments thirteen explosive cartridges were placed between the neutron source and the detector. These cartridges varied from a boron content of 3.5% (8.3 grams) to zero.

Cartridges having a boron content of 3.5%, 1.75%, .875%, .35%, .175% and .0875% were sequentially positioned along the centerline of the experimental test channel of 25 cm. width. The centerline is defined as the line from the center of the neutron source across the test channel to the cylindrical axis of the scintillation crystal. This line is perpendicular to the front surface of the paraffin moderator tank and the face of the scintillation crystal. Positions along the test channel centerline are measured from the surface of the moderator tank toward the scintillation crystal position.

The measurements were for a 25 cm. test channel width, a four curie neutron source, a 30 sec. count time and a three inch crystal scintillation detector. The results obtained were that the signal to background ratio is significantly higher in the region of the test channel near the crystal for all test cartridges. The ratio is also seen to be strongly dependent upon boron concentration within the explosive test cartridge. Thus the signal to noise ratio for a 3.5% boron cartridge was approximately 1.8 at 24 cm. whereas the ratio for the .875% boron cartridge at 24 cm. was 1.6 and only 1.2 for the .175% boron cartridge. In addition, it should be noted that the signal to background ratio for all the various cartridges is low (1.2%) for the first sixteen cm. from the source and then rises rapidly in a hyperbolic fashion. Thus the most desirable situation is where the boron source is at least 16 cm. from the source.

Under the same conditions the 3.5% boron cartridge was positioned off center at various distances from the neutron source. In general, the signal to background ratio decreases as the explosive is moved further from the center line. However, when the dynamite is placed at approximately 19 to 23.5 centimeters from the source, it may be moved from the center line without substantially affecting the signal to background ratio.

Figure 5:
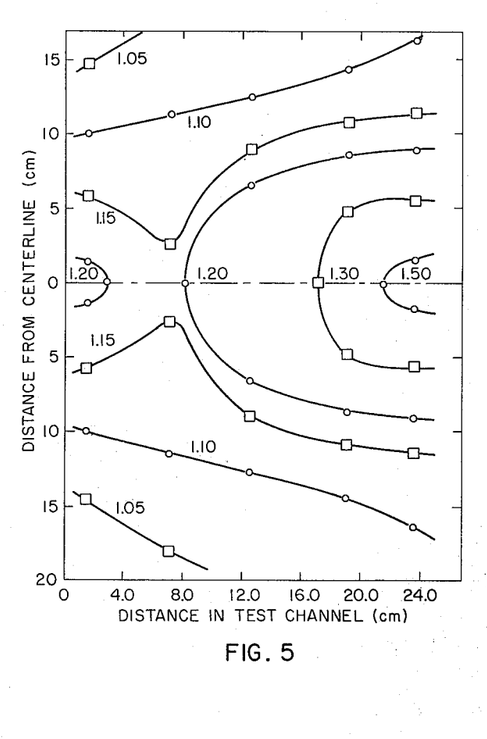
FIGURE 5 is a two dimensional plotted field pattern of signal to background ratios.

FIGURE 5 presents a composite result of the experiments moving the 3.5% boron cartridge along the centerline and transverse to the centerline. This plot presents a two dimensional representation of the actual three dimensional regions or volumes of signal to background ratios greater than the listed ratio. For example, within the small paraboloid indicated at the right hand portion of the test channel the signal to background ratio is at least 1.5 or greater. It should be noted that this data was taken with the three inch scintillation crystal for a 30 sec. count time. With a smaller crystal and a shorter count time the regions representing a certain signal to background ratio would be significantly enlarged.

Figure 6:
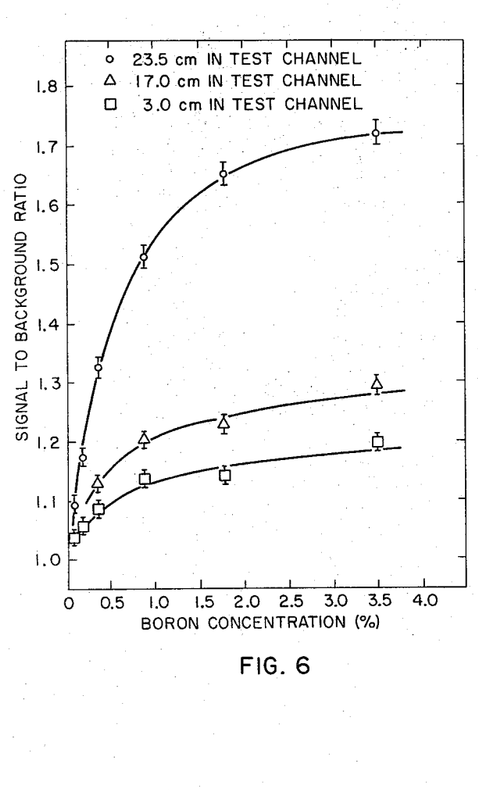
FIGURE 6 is a graph of the signal to background ratio as a function of boron concentration.

FIGURE 6 shows the effect of variation in the boron concentration. These curves represent the effect of placing the explosive test cartridges along the centerline of the test channel at 3.0, 17.0 and 23.5 cm. It is seen that at the 17.0 and 23.5 cm. positions in the test channel saturation of the signal to background ratio is attained with approximately 3.5% boron content. However, at the 3.0 cm. position saturation appears to begin with about 1% boron concentration. This difference in saturation points appears to be due to the variable thermal neutron flux in the test channel. At the 3.0 cm. position the thermal neutron flux is approximately four times as great as the flux at the 17.0 or 23.5 cm. positions. Since saturation is dependent upon the reaction rate (product of macroscopic cross section and neutron flux) and increase in the flux of a factor of four is equivalent to a factor of four decrease in boron concentration. Thus, FIGURE 6 clearly demonstrates that the highest signal to noise ratio is obtained for spacings of 23.5 cm. In addition, the highest slope or rate of change of signal to noise ratio is obtained which is definitely important in distinguishing dynamite containing suitcases from those which have none.

EFFECT OF VARYING COUNT TIME AND VARIABLE NEUTRON SOURCES

Experiments were conducted to disclose the variation of the signal to background ratio for the 3.5% boron cartridge along the test channel centerline for variable counting times of 30, 18, and 6 sec. This data was taken within a 25 cm. width test channel with the three inch scintillation crystal. The 6 sec. count time signal to background ratio is greater throughout the test channel because of a lower effective time for crystal activation which increases the background count rate. With shorter counting times the variability or uncertainty of a particular measurement will tend to increase as noted by an increase in the probable error. The results show that the signal to background is high for both 6 and 30 second count time but low for the 18 second count time.

Another series of measurements were undertaken to determine the effect of variable neutron sources on the signal to the background ratio. Variation of the signal to background ratio was observed as a function of centerline distance in the 25 cm. test channel for the one curie source, two one curie sources and the four curie source (No. 3).

These results all show that the signal to background ratio increases rapidly from 16 cm. to 24 cm. However, these experiments also show there is a general increase in signal to background ratio with an increase in neutron source strength when the explosive test cartridge is in the region of the test channel near the scintillation crystal. These results also show that regardless of the variation in the source strength, the greatest signal to noise ratio is obtained at 23.5 cm. as opposed to a 2.0 or 17.0 cm. position.

Figure 7:
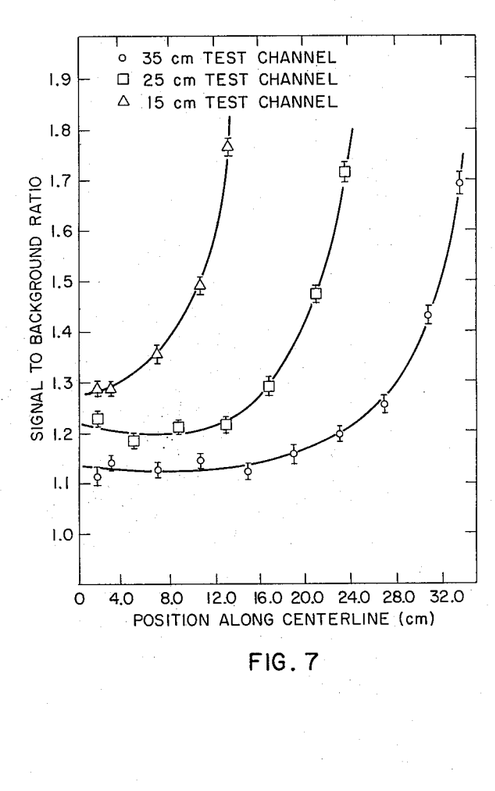
FIGURE 7 is a graph of the signal to background ratio for various lengths of test channels.

FIGURE 7 illustrates the feasibility of using other lengths of test channel and clearly shows that the best signal to background ratio is obtained at the end of the channel closest to the detector.

FIGURE 7 presents the effect of a variation in test channel width on the signal to background ratio. Again, this data was taken with the four curie neutron source, the three inch scintillation crystal, a count time of 30 sec. and cartridge "A." The signal to background ratio increases slightly near the crystal region of the test channel as the test channel width decreases. There is a significant increase in the ratio near the neutron source with decrease of test channel width because of the higher relative percentage of boron gamma rays which strike the crystal compared to background radiation.

EFFECTIVENESS OF THE APPARATUS

In order to determine the effectiveness of detecting the explosive test cartridge in an external radioactive field such as might be caused by the luminous dial of a clock or watch, a series of measurements were made with a Wittnauer "military type" watch strapped about the 3.5% boron test cartridge. The watch dial contained a relatively large amount of radium and is probably as strong as might be encountered. Again the 4 curie neutron source, the two inch crystal and a 30 sec. count time were used for these measurements. The signal to background ratio decreases from about 2.4 for the cartridge alone to about 1.6 for the cartridge and watch when they are close to the crystal detector. However, near the source end of the test channel there is essentially no effect on the ratio. One may therefore conclude that an adequate signal to background ratio can be obtained in the presence of radioactivity as generated by a radioactive watch. The above-mentioned results therefore again emphasizes the desirability of detecting the dynamite in the 16–24 cm. range.

To determine the effectiveness of detecting an explosive cartridge in actual luggage, a simulated test was conducted with a typical leather suitcase (man's type) of dimensions 21.0 inches in length, 10.0 inches in width and 14.1 inches in height. These tests were conducted with and without the explosive test cartridge in the suitcase which was filled with typical luggage components. Table III presents a list of the suitcase contents.

TABLE III.—EXPERIMENTAL SUITCASE CONTENTS

Dress shirts (6)
Men's socks (11 pairs)
Travel kit with toothbrush, toothpaste, etc.
Pajamas (1 pair)
Electric shaver
Wool sweater
Hair tonic (1 bottle)
After shave lotion (1 bottle)
Baby powder (1 metal container)

The boron containing dynamite cartridge was placed between the contents and the sides of the suitcase both near the detector and near the neutron source. The signal to background ratio data for the 3.5% boron cartridge "A" in these three positions in both the empty and filled suitcase was taken. This data was taken with the 4 curie neutron source, a three inch crystal and a 30 sec. count time. It is interesting to note again the reduction of the ratio near the detector for the full suitcase and its increase (as compared to the empty suitcase) near the beginning of the test channel resulting in a more uniform ratio throughout the test channel region. In addition, the information obtained shows a comparison of the signal to background ratio for cartridge "A" in the full suitcase for a counting time of 6 sec. and 30 sec. The ratio is significantly higher for the 6 sec. measurement because of the shorter crystal activation time. These results clearly demonstrate that the signal to background ratio is highest in the 16–24 cm. range.

SIGNAL TO BACKGROUND RATIO ANALYSIS

The general method of determining the number of signal counts due to neutron capture by boron consisted of selecting a particular analyzer energy window surrounding the region of the energy spectrum in which the boron peak should occur. This corresponds to a definite number of channels on the pulse height analyzer or a single window on a single channel analyzer, viz, 0.477 mev. Determination of the count rate in the same energy window or channel without the presence of boron gave rise to the background count. Division of these two count rates resulted in the signal to background ratio.

To determine the presence of boron in a single scan of luggage requires a method of analysis slightly different from the above. The signal count rate can be obtained in the manner indicated above. However, the background count rate can be obtained by choosing an energy window of the same width as used in the signal determination but located at a point in the higher energy region of the spectrum. By taking the ratio of these two counts, a signal to background ratio is obtained wherein the signal represents the number of counts about the 0.477 mev. energy region and the background the number of counts about some higher energy region. Comparison of this ratio with and without the presence of boron results in a ratio that is usually greater than the signal to background ratio that has been presented in the previously reported measurements. The entire background spectrum is decreased with the presence of boron which is apparently the result of a partial neutron shielding of the crystal by boron. Some consideration should be given to the region of the spectrum used for the background count determination. If too high an energy region is used the background count rate is low with a resultant high probable error in the signal to background ratio due to a large statistical variation in the background. Therefore, it appears that the background scan should be as close as possible to the prospective boron peak without interfering with the peak. This suggests a region around 0.8 mev.

The formulation for the signal to background ratio with its probable error is, $$\frac{S}{B} \pm \left(\frac{1}{S} + \frac{1}{B}\right)^{1/2}$$

where S represents the signal count rate and B the background count rate. It can be seen from the above formulation that as the ratio ($S/B$) increases the standard deviation in the ratio increases in absolute value but decreases in relative value or percent variation. Also as the count rate increases, i.e., as S or B or both increase in value, the standard deviation decreases. This indicates the desirability of a high signal to background ratio and a high number of counts both in the signal and the background count rate.

PULSED NEUTRON GENERATOR MEASUREMENTS

One method of reducing the effects of background in this approach is to employ a pulsed neutron generator as the neutron source. By producing a fast neutron pulse within a few microseconds within the moderator assembly and then allowing the fast neutron pulse to decay, a pulsed thermalized neutron flux is produced within the test channel. By electronically timing the scintillation crystal to detect gamma radiation, the signal emitted by a boron test cartridge can be detected with a low background count rate due to fast neutrons or other radiation associated with the production of the fast neutron pulse.

A series of measurements was undertaken with a neutron generator (Kaman Model No. NT-60-8) which has a nominal production rate of $10^7$ fast neutrons per pulse with a pulsing rate up to 10 pulses per second. By generating a sawtooth wave at the instant of neutron production and then tapping a fraction of the sawtooth signal after the fast neutron pulse had been generated, a variable detector delay time was obtained. Hence, the duration of the sawtooth determined the detection time of the analyzing system.

The electronic detection system was similar to that presented in FIGURE 4 with the addition of a wave form generator (Tektronix Model No. 161) and a pulse generator (Tektronix Model No. 162). The neutron generator was placed in a tank of water with cubical dimensions of approximately 49.5 cm. A series of measurements with explosive test cartridges "A" 3.5% boron and "G" zero boron indicated that the highest signal to background ratio that could be obtained was approximately 1.2 upon variation of the test cartridge within the test channel for various delay and detection times. This low signal to background ratio can be attributed to the relatively large dead time of the pulse height analyzer (a minimum of 10 microseconds). One hundred fast neutron pulses (10 sec. count time) were used in these measurements and resulted in a low number of counts in both the signal and background count rates. The use of extremely fast scalers (10 megacycles) can result in more meaningful statistics for reasonable short count times.

SUMMARY

The general approach described in the preceding specification of applying inert material seeding to the problem of detection of explosive materials by gamma ray monitoring is a special case of neutron activation analysis wherein the halflife of the radioisotope is of the order of $10^{-14}$ sec. This extremely low halflife value of the excited isotope is of the utmost importance since it insures that the residue isotope will be non-radioactive a very short time after neutron irradiation. This aspect is important in the field of nuclear isotope technology when public exposure is a factor. Another advantage of the approach of this invention exists in the efficiency of the detection of prompt gamma radiation upon neutron activation. For a given detector signed strength the curie-time or the number of disintegrations which result in prompt gamma ray emission is a minimum. This factor increases as the halflife of the isotope increases.

Residual induced gamma activity in luggage will not, under any circumstances, constitute a significant hazard to personnel. It appears that the dose delivered to a passenger from induced activity in his luggage will always be quite small compared to the increase in the amount of the natural radiation dose received while flying a few hours at altitudes above 15,000 ft. because of the increase in the dose rate from cosmic radiation which increases in altitude above the surface of the earth. In addition, the number of neutrons required for this detection method ($10^3$–$10^4$ neuts./cm.$^2$ sec.) is small enough to be harmless to photographic film which might be part of the contents of normal luggage. Another advantage exists in the fact that the system can be automatic with no human observer required.

A summarization of the optimum signal to background ratio composites, as determined by these measurements, for selective exposive test cartridges is presented below in Table IV. This table presents data taken with the 4 curie source, a fully packed suitcase in a 25 cm. test channel, detection with the two inch diameter scintillation crystal for a scan time of 6 seconds and a single test cartridge of one-half pound nominal weight.

TABLE IV.—OPTIMUM SIGNAL TO BACKGROUND RATIO.

| Cartridge | Boron Content (Percent) | Ratio Near Source | Ratio Near Detector |
| --- | --- | --- | --- |
| A | 3.50 | 1.46 | 1.90 |
| C | 0.875 | 1.38 | 1.68 |
| D-1 | 0.350 | 1.33 | 1.45 |

It is noted that this optimum arrangement produces a signal to background ratio that is somewhat constant at low boron seeding concentrations. If a boron content of 0.5% is chosen (about 1 gram of boron per half pound cartridge) the ratio would appear to vary from a high value of about 1.50 near the detector to about 1.35 near the nuetron source region of the test channel.

It must be emphasized that in all of these measurements an effort was made to measure as many possible conditions and occurrences as currently foreseen to be probable. Therefore no great effort was expended in obtaining an "optimum" signal to background ratio with various possible neutron sources, detectors and shielding configurations which may be available. A different neutron source which produces neutrons of lower energy could significantly affect the ratio; for example, an americium neutron source could improve the efficiency of the system. Selection and testing of various types of gamma ray scintillation crystals as well as shielding arrangements around the crystal could reduce crystal activation by fast and slow neutron capture in the crystal.

An increase in the neutron source strength tends to increase the signal to background ratio to a limiting value referred to as saturation. More important, both the signal and background count rates increase with neutron source strength which results in a smaller statistical variation of the signal to background ratio. For a particular desired standard deviation the source strength and the count time are linearly related, in that for a longer scan time a lower strength neutron source would suffice. Therefore, it appears that the inspection times is an important factor in this detection scheme. At a flight terminal installation the inspection time would be a function of traffic load. A low load flight terminal could tolerate a more time-consuming testing operation. Therefore, a longer scan time per unit of luggage or less detection units per airport might be feasible. In addition, the use of a centralized testing device could suffice at a low load flight terminal.

It appears that methods which can detect the smallest quantity of explosive in the shortest detection time require the addition of additive materials to the explosive device. This would require the cooperation of explosive manufacturers as well as of Government regulatory agencies. It appears, from informal discussions with an explosive manufacturer that boron compounds such as boric acid are compatible with explosive ingredients such as ammonium nitrate and nitroglycerin. The amount of borated material that can be added to explosive powder would be limited by both technical and economic considerations. Many types of boron compounds are known in the art as for example, sodium tetraborate decahydrate and sodium tetraborate pentahydrate, anhydrous borax, boric acid, rasorite-46, rasorite-65, etc.

It appears that too high a boron concentration may impair the effectiveness of the explosive cartridge. A 0.5% boron content would comprises 2.85% of additive material in the form of boric acid. This amount of inert material could be added to the explosive but may cause some loss of explosive effectiveness. This possible problem will have to be given serious consideration by the explosive industry and the Federal agencies involved if tagging of explosive powders is undertaken.

An alternative to adding the borated material to the explosive powder is the possibility of adding it to some other component of the explosive device such as the paper explosive wrapper or the detonator cap. A thin spray of borated material within the wax coating on the cartridge might be the best method of adding a tagging material.

The transformation from untagged to tagged explosives would deplete existing inventories by an estimated 80% to 90% in one year (1). However, there is the problem that there may always be some "old dynamite" in existence which is untagged.

Some consideration should be given to possible attempts to foil the detection of the explosive. One such scheme, which might arise, involves surrounding of the explosive with the material of high neutrons capture cross section to prevent neutrons from reaching the boron tagged explosive and hence no liberation of the boron gamma ray. This can be overcome by monitoring the transmitted neutron flux through the luggage to determine whether neutrons are being excessively absorbed within the luggage. Another scheme that might be use is to surround the explosive with a high density shield such as lead to prevent the escape of gamma radiation from the boron in the explosive. The excessive weight of the luggage should be an indication of this attempt to foil detection because of the high unit weight of lead. Hence, it appears that the counter-measures to prevent detection of the explosive can, themselves, be detected.

If rasorite-46 (sodium borate concentrate) is used to seed explosives in place of boric acid because of its relatively low cost then a 3.3% concentration is required to obtain a 0.5% boron content. If this concentration is used in all commercial explosives, it would require approximately 33 million pounds (16,500 tons) of rasorite-46. This would cost $785,000 at present prices.

The selling price of commercial explosives, depending upon the type, varies from approximately $16.00 to $30.00 per hundred pounds. An estimated average cost can be taken to be $20.00 per hundred pounds with an estimated production cost of approximately one-half this or $10.00 per hundred pounds. Therefore, the total annual commercial explosive production cost would be about $100,000,000.00. The cost of the borated additive material would constitute about 0.75% of the current production cost or 0.375% of the selling price. If the borated material can replace other inert materials in explosives, the cost of additives can disappear with merely a substitution of materials. The actual economic effect on explosive production costs need to be given more thorough study as this approach to explosive detection develops.

Another aspect of adding a tagging material to explosives that should be considered, is the source of explosives used in previous aircraft destruction. It appears that the saboteur does not have access to the bulk of high explosives which are used in large commercial operations such as mines and construction projects. Explosives from these sources have not been used in aircraft destruction (3). Past experience indicates that the source of explosives in aircraft destruction has been the relatively small sample from which the public can make purchases. This consists of commercial type, one-half pound cartridges such as are readily available in rural general supply stores (3). Therefore, it appears that this form of explosive is the type that should be given main consideration in explosive tagging. The application of this philosophy could reduce, by a substantial amount, the cost of additives in commercial explosives. This aspect of the problem must also be given careful study, as the additive approach to bomb detection develops.

The economics of tagging explosives become obscure if the potential wide use of explosive scanning is considered. Hidden explosives, for example (buried underground as might arise in blasting operations), may be able to be detected by a portable scanning device. The potential utilization of tagged explosives can drastically affect the economics of incorporating additives into explosives.

A commercial version of the device should contain a high efficiency gamma ray detector which can absorb most of the liberated gamma radiation. A sodium-iodide scintillation crystal is quite effective, but expensive when fabricated in large dimensions. A practical solution to the problem of large area detectors is the use of a heavy element loaded plastic scintillator or a relatively low cost liquid scintillator.

An effective detectional device would probably require the combination of several different schemes. The boron tagging approach is considered to be a relative technique directed toward a rapid scan of baggage resulting in a low percentage of possible suspected bags. These possible suspected bags would then be scanned by a more absolute but time consuming technique, which requires human observation such as an X-ray scan or actual visual inspection of the luggage contents.

OTHER METHODS AND ABSORBERS

Nearly all materials emit gamma radiation by the process of radiative capture when exposed to thermal neutrons. These gamma ray spectra have been investigated for many of the naturally occurring elements as well as particular stable and radioactive isotopes. In general, these spectra are complicated because they consist of many gamma rays of closely spaced energies. The number of gamma rays emitted by a given elemental component of a material is proportional to the mass of the element present, its radiative capture cross section and the thermal neutron flux; and inversely proportional to its atomic number.

In the radiative capture process, gamma rays are emitted immediately following neutron capture. The total gamma ray energy is equal to the binding energy of the extra neutron in the capturing nucleus, and is of the order of 7 to 8 mev. for most nuclei. Hydrogen is an exception with an energy of 2.23 mev. being emitted in a single gamma ray. In nearly all other gamma ray emissions, the spectra is quite complex with many gamma rays of different energies, the sum of which is equal to the binding of energy of the neutron. This complexity of gamma ray spectra makes it difficult to detect and resolve gamma ray energies so as to readily indentify materials.

Radiative capture neutron cross sections tend to be highest for high atomic number materials, such as the rare earth series of elements such as cerium, praesodymium, samarium and gadolinium etc. However, the complexity of gamma ray spectra tends to increase with the atomic number of the capturing material. Therefore, there is somewhat of a conflict in the case of gamma ray detection between a desirable high cross section and an undesirable complex gamma ray spectra.

TABLE V.—POSSIBLE HIGH CROSS SECTION ADDITIVE MATERIALS

[$\sigma_a$ greater than 200 barns]

| Element | Z | $\sigma_a$ (Barn) | Gamma Ray Spectra |
|---|---|---|---|
| Gd | 64 | 46,000 | Complex: 11% of captives to $E\gamma=0.96$ mev. 10% of captives to $E\gamma=1.18$ mev. |
| Sm | 62 | 5,600 | Complex. |
| Eu | 63 | 4,300 | Complex. |
| Cd | 48 | 2,450 | Complex. |
| Dy | 66 | 950 | Complex. |
| B | 5 | 0.1 (n, $\gamma$) 755 (n, a) | Simple for (n, a), $E\gamma=0.477$ mev. |
| Ir | 77 | 440 | Complex. |
| Hg | 80 | 380 | Complex. |

Table V presents a list of possible high cross section additive materials with cross sections greater than 200 barns. It is seen that all gamma ray spectra are complex except the previously encountered boron (n, a) reaction.

A series of measurements was undertaken to realistically determine the technical feasibility of this approach. A testing device similar to that presented in FIGURE 3 was used to analyze a sample of gadolinium oxide containing about 50 grams of gadolinium in a Lucite plate holder 17 cm. by 22 cm. The electronic components of the system are identical to the block diagram presented in FIGURE 4. Because of the complex gamma ray spectra, a "difference method" in the detection of the spectra was required to see the more prominent peaks. This "difference technique" consisted of allowing the target signal plus the background signal to be analyzed and then subtracting the background signal in the analyzer in a second identical measurement but without the target in the test channel. This method is not a practical situation but the technique was used to determine some parts of the gadolinium spectra. A six minute measurement resulted in the observation of the 0.96 and the 1.18 mev. gamma ray peaks with the one curie neutron source.

Figure 9:
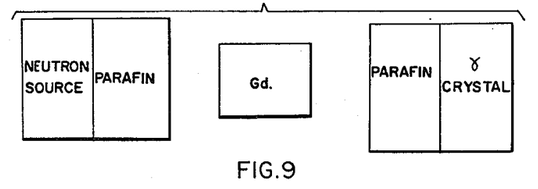
FIGURE 9 is a block diagram of a preferred flux depression system.

Another embodiment of this invention as shown in FIGURE 9 utilizes the gamma radiation emitted by hydrogen upon neutron capture to give an indication of the presence and amount of a neutron absorber in the test channel. Although hydrogen has a small cross section (0.33 barn) it emits a single gamma ray with an energy of 2.23 mev. After the neutrons emerge from the layer of moderator surrounding the source, they traverse the test channel, and strike another layer of moderator which is placed in front of the scintillation detector. Therefore, the crystal detects the 2.23 mev. gamma rays from two layers of moderator, before and after the test channel. The area between these two layers of moderator, the test channel, can contain variable materials including possible high neutron capture additive materials such as gadolinium. When a high cross section material is present in the test channel the neutron flux is depleted allowing less neutrons to flow into the layer of moderator near the crystal. This causes a decrease in the number of 2.23 mev. gamma rays seen by the electronic detection system. Simultaneously, the background gamma radiation increases due to the (n, γ) reaction from gadolinium. Therefore the ratio of the number of hydrogen gamma rays to the background gamma radiation can give an indication of the presence of a large neutron absorber in the test channel.

For a small test channel width of 7.4 cm., the effective detection ratio is of the order of 1.25 for a one minute count time and a one curie source. This data is obtained by analyzing the number of 2.23 mev. gammar rays due to hydrogen capture compared to the background radiation. This ratio is determined under the same conditions with and without the presence of gadolinium. The variation of the ratio is an indication of the effect of gadolinium as a tag material.

NEUTRON FLUX DEPRESSION

Neutron flux depression is a possible method of detecting explosives by the addition of a high thermal neutron absorption cross section material to the explosive device. By observing the effect of this material on a thermal neutron flux field in a test channel, the presence of the material may be detected. A thermal neutron detector as shown at 7 in FIGURE 2 can meausre the decrease in neutron count rate caused by a neutron flux depression around it because of the absorption of neutrons in the high cross section material, and hence, their disappearance from the test channel.

Figure 8:
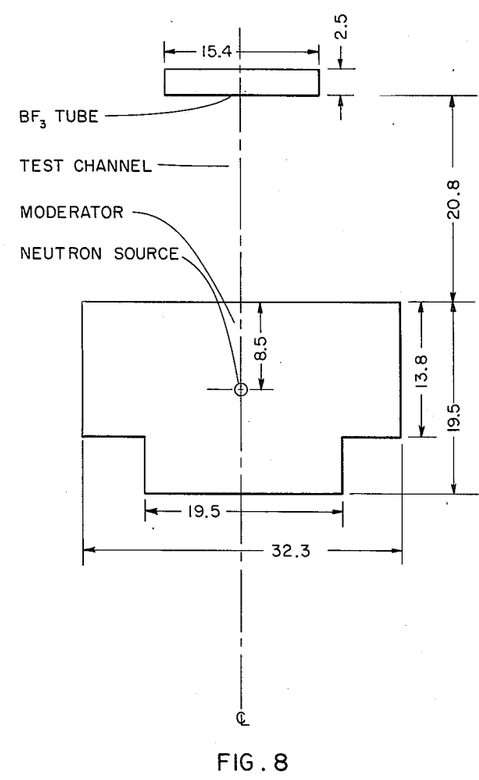
FIGURE 8 is a top view of the relative positions of the apparatus for a flux depression system.

FIGURE 8 presents the geometry of this system which produced optimum results for these measurements. Neutron source No. 1 (one curie source) is imbedded in a paraffin moderator tank of the indicated dimensions. The height of the paraffin is 39.4 cm. with the neutron source 14.2 cm. above the reference base. The test channel width is 20.75 cm. A $BF_3$ boron trifluoride neutron detecting tube, an N. C. Wood type (Model No. G–10838) of six inch length and one inch diameter is symmertically placed about the centerline, 12.8 cm. about the reference plane. An electrical circuit for such operation is the same as shown in FIGURE 4 with the exception that BF detector is substituted for the sodium iodide crystal and photomultiplier.

The targets used in these measurements consisted of compounds of gadolinium, samarium and boron.

TABLE VI.—TARGET SPECIFICATIONS

| Target | Neutron Absorber | Weight (gm.) |
|---|---|---|
| P | $Gd_2O_3$ | 19.2 |
| Q | $Gd_2O_3$ | 15.5 |
| R | $Gd_2O_3$ | 10.1 |
| S | $Gd_2O_3$ | 4.02 |
| T | $Gd(NO_3)_3$ | 9.60 |
| U | $Gd_2O_3$—$Sm_2O_3$ | 15.2 |
| V | $Gd(NO_3)_3$—$Sm(NO_3)_3$ | 9.25 |
| W | $Na_2B_4O_7 \cdot 10H_2O$ | 21.2 |

The targets consisted of thin strips of high cross section material, sandwiched between two thin Lucite sheets. Each target contained three absorption strips 1.25 inches wide and 8.0 inches in height approximately 0.5 inches apart. These targets simulated three cartridges of explosives. The material was distributed uniformly throughout the area of the strips. Targets "P" through "S" contained variable amounts of gadolinium oxide (45%); target "T," gadolinium nitrate; target "U," a mixture of gadolinium oxide (45%) and samarium oxide (45%); target "V," a mixture of gadolinium nitrate (45%) and samarium nitrate (45%); and target "W," borax.

Experiments were made to measure the background to signal ratio as a function of position along the 20.75 cm. width test channel centerline for targets "P" through "W." The background to signal ratio was obtained by taking the ratio of the total number of counts for a two minute counting time without and with the target material in the test channel. In all cases the target was placed symmetrically about the centerline. As seen from the figures, there is a general increase in the background to signal ratio (greater than 2.0) as the target is placed closer to the $BF_3$ detector. For targets "R" and "T" there is decrease in the background to signal ratio for target "T" which contains the oxide form. This is due to the lower effective gadolinium content. It is also seen that the effect of samarium is to lower the ratio because of its smaller cross section. The background to signal ratio obtained with borax in target "W" is significantly lower than the other materials because of its lower cross section.

In addition, information was obtained as to the background to signal ratio for target "P" as a function of count time for four different positions in the test channel, viz., at 2, 7, 12, and 17 cm. To obtain better counting statistics of the background to signal ratio in this set of measurements, 10 individual measurements were made in each case for the 1, 2, and 5 second scanning time and five measurements for the 10, 30, 60 and 120 second scanning time. It can be seen that the ratio is sustained (because of the average value) down to count times of one second with increasing statistical error because of the decrease in the total number of counts.

Another series of measurements was undertaken with the explosive test cartridges in the test channel instead of the Lucite targets. Explosive test cartridge "A," highest boron content, when placed in the test channel resulted in a maximum background to signal ratio of the order of 1.1.

Having thus described my invention and realizing that there are numerous equivalents and other applications, my invention will be pointed out in the claims. In particular, it should be noted that an important aspect of this invention is the generation of low level thermal neutrons (.025 mev.) flux of less than $10^5$ neutrons/cm.²/ sec. but greater than $10^3$ n/cm.²/sec. and the use of a high cross sectional material such as boron which will provide a high rate of gamma ray production after absorption of this low level neutron flux. In such a system it is obvious that a broad surface area for such flux emission is highly desirable for examining broad surfaces such as suitcases.

I claim:

1. A method for detecting explosives in luggage in which the explosives have been seeded with a high cross section neutron absorber comprising placing a low level thermal neutron source along one side of said luggage, said source having a sufficiently low flux density as to be non-destructive to the contents of ordinary luggage including photographic film, irradiating said luggage with said thermal neutron source, placing a gamma ray detector on the other side of said luggage, and comparing the amount of gamma rays emitted directly by said absorber with background gamma rays as an indication of the presence of an explosive.

2. A method for detecting explosives in luggage in which the explosives have been seeded with a high cross section neutron absorber comprising, placing a low level thermal neutron source along one side of the luggage, placing a detector on the other side of said luggage, irradiating said luggage with said low level thermal neutrons, measuring the signal and background detected respectively with and without the luggage present and, adjusting the relative positions of the luggage and detector for obtaining a signal to background ratio of at least 1.5.

3. A method for detection comprising tagging with boron the subject to be detected, radiating a source of low level thermal neutrons at said subject with a flux density of less than $10^5$ neutrons/cm.$^2$/sec. and at an energy of substantially .025 electron volt so that the ratio of $_3Li^7$ in the ground state to $_3Li^7$ in the excited state is very small, detecting the presence of a 0.477 mev. gamma ray whereby the detection of large quantities of said gamma ray indicate the presence of the subject.

4. A method for detection comprising tagging with boron the subject to be detected, radiating a source of .025 ev. thermal neutrons at said subject so that the ratio of $_3Li^7$ in the ground state to $_3Li^7$ in the excited state is less than .1, detecting the presence of the large amounts of 0.477 mev. gamma ray in contrast with the spurious gamma rays present as an indication of the presence of the subject desired to be detected.

5. Detection apparatus comprising a fast neutron source, a paraffin moderator having a broad surface area for slowing the fast neutrons so that thermalized neutrons of the order of .025 ev. energy are produced, a lead wall in front of said neutron source having a large planar surface area for preventing gamma radiation from the source in at least one direction while permitting neutrons from said source to pass through the wall in said one direction of the order of less than $10^4$ neutrons/cm.$^2$/sec., a sodium iodide scintillation crystal spaced from said source along the extension of a line perpendicular to the wall from the source whereby a minimum of such background gamma rays reach said crystal, photomultiplier means for receiving the light impulses from said crystal, a pulse height analyzer for receiving the output of the photomultiplier and for providing an output for a particular height or energy level of the received energy, said analyzer including means for determining the rate of a particular output pulse whereby a broad front of low level neutron radiation is directed from the source toward the crystal which is non-destructive of commonly used articles including photographic film but is sufficient to emit gamma rays from a high cross-section material thus permitting an examination of substantially large articles which may contain the high cross section material in only a small portion thereof.

6. A combination as in claim 5 for detecting the presence of a boron containing substance in which the analyzer is adjusted for receiving and selecting a signal representative of a 0.477 mev. gamma ray which has been radiated from the boron substance and in which an alarm is connected to said rate circuit for operation when the rate of the 0.477 mev. gamma rays exceeds a predetermined level.

7. A method of detection of an object having a high nuclear neutron cross material which emits energy at a predetermined level comprising radiating a source of thermal neutrons at said object, sensing a first ratio of the amount of emission of energy at said predetermined level with respect to the energy emitted at a slightly higher energy level when said object is irradiated, sensing a second ratio of the amount of energy at said predetermined level with respect to the energy emitted at said slightly higher energy level when said object is no longer present and with said source still radiating, comparing the two ratios, and operating an alarm when the first ratio is substantially greater than said second ratio.

8. A method for detecting an object having a high nuclear neutron cross section material which emits energy upon neutron absorption comprising, irradiating said object with thermal neutrons, sensing the rate of energy emitted by said high cross section material in a particular energy level when the object is placed between the source and sensing means, sensing the rate of energy emitted in the same energy level when said object has been removed from between the source and sensing means, determining the value of the ratio of the two rates sensed whereby a ratio substantially greater than one indicates the presence of the object.

9. A method of detecting boron with a minimum neutron radiation comprising, passing an object containing boron along a pathway, transmitting a low level thermal neutron flux transverse to said pathway directed towards said object for producing at least a 10 to 1 ratio of lithium-7 in the excited state to lithium-7 in the ground state whereby large numbers of gamma rays are emitted in the return of the lithium from the excited to the ground state, sensing the rate of generation of gamma rays from the boron with respect to some background or threshold level whereby a neutron source having a flux of less than $10^5$ neutrons/cm.$^2$/sec. provides detection of boron accurately.

10. Apparatus for detection of boron with a minimum of neutron radiation comprising, a fast neutron point source, a moderator for thermalizing said neutrons, said source and moderator being adapted to provide a low level thermal neutron flux of the order of .025 ev. of less than 100,000 neutrons/cm.$^2$/sec. over a substantially broad face of the moderator, gamma ray detecting means for responding to a 0.477 mev. gamma ray, means for passing an object between said moderated source and said detecting means, whereby if said object contains boron the low level neutron flux when absorbed by the boron will produce at least a 10 to 1 ratio of lithium-7 in the excited state to lithium-7 in the ground state thereby providing large quantities of the .477 mev. gamma resulting from de-excitation of the excited lithium.

11. A combination as in claim 10 in which said neutron point source has an energy level of 3–5 mev., in which said moderator is paraffin and substantially completely encloses said point source, and in which the moderator has substantially a broad flat surface to provide a broad wave front for such low level flux, and in which said detecting means includes a pulse height channel analyzer having at least one channel responsive to 0.477 mev. and another channel responsive to another energy level whereby the ratio of the rate of pulses received in said one and another channel with and without the object present is an indication of the presence of boron.

12. A combination as in claim 10 in which said detecting means includes a sodium iodide crystal, and a neutron absorbing casing which does not emit gamma rays for substantially enclosing said crystal.

13. The method as in claim 1 further including the step of generating said thermal neutrons substantially uniformly over a broad surface area substantially the area of the side of average conventional luggage with an energy of .025 electron volt per neutron and a flux density of less than $10^5$ neutrons per squared centimeter per second.

14. The method as in claim 1 further including the steps of periodically pulsing the thermal neutron source for a short time period, and subsequently detecting the gamma rays present after one pulse of neutrons has ceased and before another pulse has started.

References Cited in the file of this patent

UNITED STATES PATENTS

| | | |
|---|---|---|
| 2,398,324 | Pontecorvo | Apr. 9, 1946 |
| 2,474,271 | Meyer | June 28, 1949 |
| 2,752,504 | McKay | June 26, 1956 |
| 2,938,119 | McKay | May 24, 1960 |
| 2,948,810 | Caldwell | Aug. 10, 1960 |
| 3,008,047 | Earley | Nov. 7, 1961 |
| 3,009,062 | Brooksbank | Nov. 14, 1961 |
| 3,019,341 | Monagan | Jan. 30, 1962 |

FOREIGN PATENTS

| | | |
|---|---|---|
| 699,129 | Great Britain | Oct. 28, 1953 |